(12) United States Patent  
Adderton

(10) Patent No.: US 7,641,180 B2  
(45) Date of Patent: Jan. 5, 2010

(54) HANDRAIL OR TOP RAIL, POST AND PANEL ASSEMBLY AND CONNECTOR THEREFOR

(75) Inventor: David Adderton, Wingfield (AU)

(73) Assignee: BALU PTY Ltd., Wingfield, South Australia (AU)

( * ) Notice: Subject to any disclaimer, the term of this patent is extended or adjusted under 35 U.S.C. 154(b) by 398 days.

(21) Appl. No.: 10/571,619

(22) PCT Filed: Sep. 17, 2004

(86) PCT No.: PCT/AU2004/001264

§ 371 (c)(1),
(2), (4) Date: Mar. 13, 2006

(87) PCT Pub. No.: WO2005/028776

PCT Pub. Date: Mar. 31, 2005

(65) Prior Publication Data

US 2007/0029534 A1    Feb. 8, 2007

(30) Foreign Application Priority Data

Sep. 19, 2003   (AU) .............................. 2003905113

(51) Int. Cl.
*E04H 17/04* (2006.01)

(52) U.S. Cl. ..................... 256/67; 256/65.08; 256/65.15
(58) Field of Classification Search ................... 256/67, 256/70, 65.02, 65.15, 65.08, 65.07
See application file for complete search history.

(56) References Cited

U.S. PATENT DOCUMENTS 5,452,880 A * 9/1995 Bailey .......................... 256/67

FOREIGN PATENT DOCUMENTS

| EP | 0833018 A2 | 4/1998 |
| JP | 08120869 A | 5/1996 |
| JP | 2003119988 A | 4/2003 |
| JP | 2003307004 A | 10/2003 |

* cited by examiner

*Primary Examiner*—Victor MacArthur
(74) *Attorney, Agent, or Firm*—The Maxham Firm

(57) ABSTRACT

A rail and supported panel assembly having first and second rail portions, each portion having a constant cross section defining an elongate recessed channel on an underside. Also included are a panel supported at a top edge, a post for supporting the rail portions, and a rail-to-post connection assembly located between the post and the rails. The connection assembly has a pair of partially overlapping arms movable with respect to each other about a pivot to accommodate a range of first and second rail portion alignment angles.

10 Claims, 5 Drawing Sheets

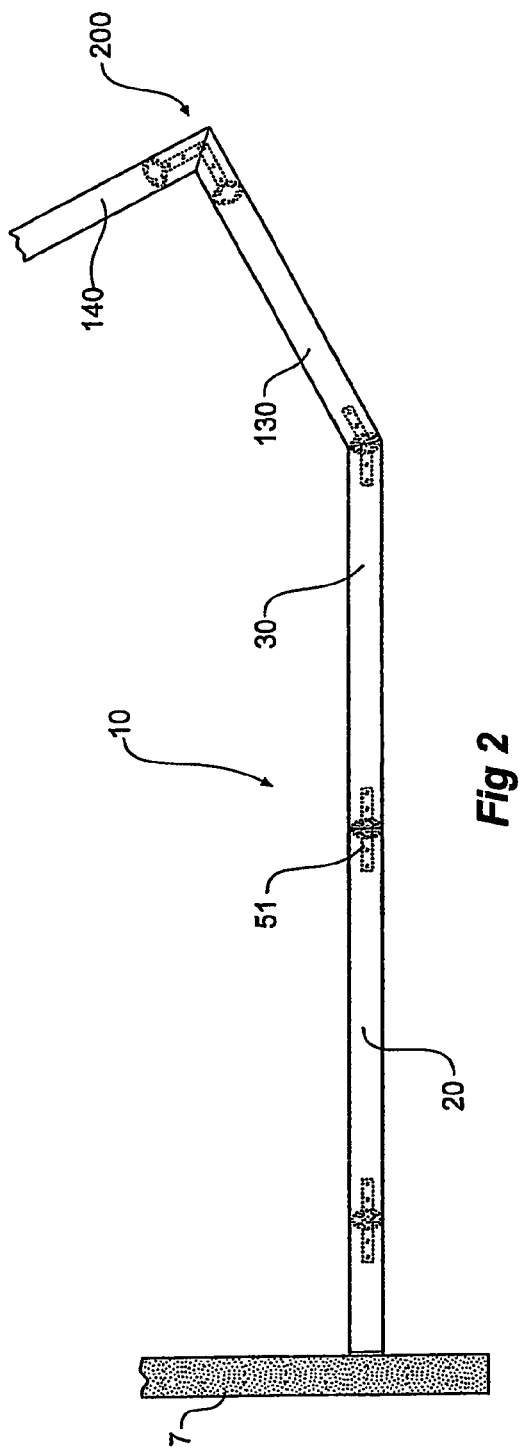
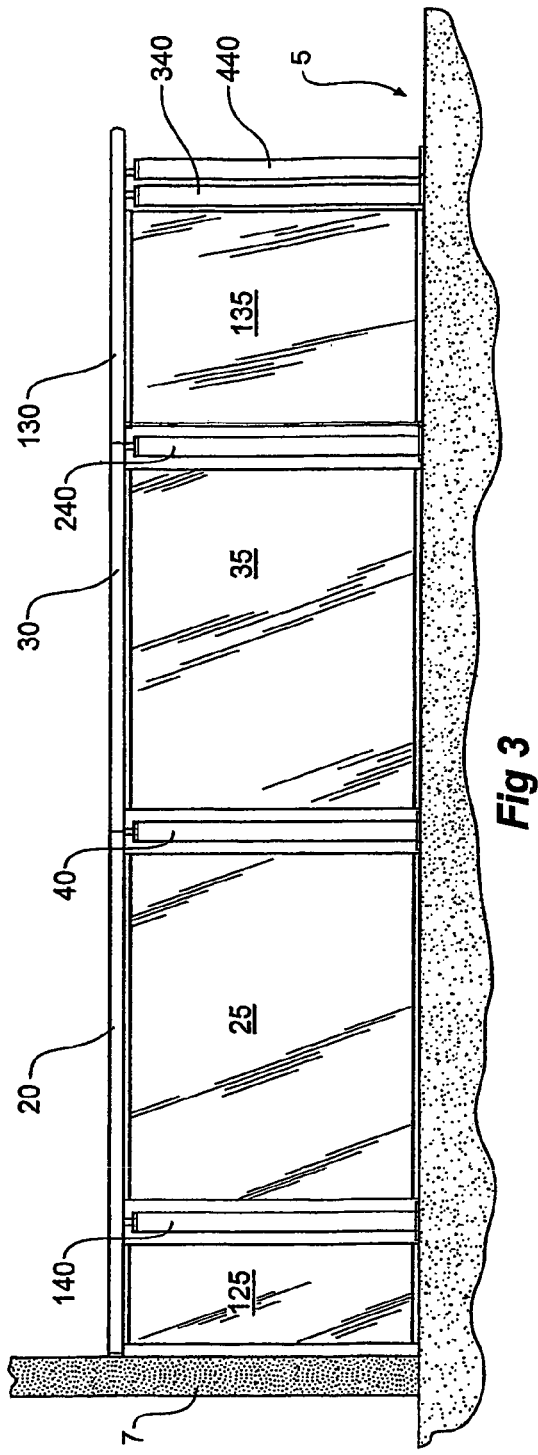

HANDRAIL OR TOP RAIL, POST AND PANEL ASSEMBLY AND CONNECTOR THEREFOR

FIELD OF THE INVENTION

The present invention relates to handrails or top rails, balustrades, balcony barrier assemblies and the like.

BACKGROUND

Barrier assemblies are provided for balconies, stairways, pathing, plazas, pool surrounds and many domestic, commercial and industrial applications. Many barrier constructions include a top rail, and if at an appropriate height, the rail is in the form of a handrail. A wide variety of post and rail designs, with and without infill panels are known. Existing designs suffer from a range of problems. For instance, with commonly used welded stainless steel handrails, the butt welds between lengths of stainless steel handrail require considerable on site work in order to provide an aesthetically pleasing and structurally sound continuous handrail. Some designs use unsightly bolts or other fixings. Other problems with existing designs include complexity of on site assembly, finger entrapment cavities and sharp edges. Where top rails, including handrails, are required to deviate from simple straight and right angle bend layouts, there is often a need for prefabrication to occur off site.

It is an object of the present invention to provide an assembly that overcomes at least some of the above-identified problems.

SUMMARY OF THE INVENTION

According to a first aspect of the invention there is provided a rail and supported panel assembly comprising:
 a first rail portion and a second rail portion, each portion having a constant cross section, the cross section defining an elongate recessed channel on an underside;
 a panel supported at a top edge thereof within the recessed channel of either one of the first and second rail portions;
 a first post for supporting the first and second rail portions;
 a rail-to-post connection assembly located between the first post and the first and second rails, the connection assembly having:
  a pair of partially overlapping arms, each arm fitting wholly or substantially within a respective recessed channel; and
  a primary fastener having a shaft, the shaft passing through a hole within an overlapping portion of each of the arms thereby providing a pivot about which the arms can be adjusted, the shaft extending into the post so as to secure the arms with respect to the post,
 wherein the arms are movable with respect to each other about the pivot to accommodate a range of first and second rail portion alignment angles.

Preferably the assembly further comprises secondary fasteners connecting each of the arms to its respective rail portion.

Preferably the secondary fasteners are rivets, each rivet penetrating though its arm up to its respective rail portion.

Alternatively, the secondary fasteners may be screws for instance.

Preferably the post is hollow and has internal walls shaped to receive an insert.

Preferably the assembly further comprises a locking member for locking the connection assembly to the first post, the locking member comprising the insert, wherein the locking member is actuated by the primary fastener to grip the internal walls.

Preferably the insert comprises an upper portion defining a through hole and a lower portion defining a threaded hole for receiving a thread on the shaft, the through hole and shaft sized to provide relative clearance,
 wherein the upper and lower portions join at inclined engaging faces that slide relative to each other when forced together by tightening of the primary fastener, so as to cause the insert to grip the internal walls.

According to a second aspect of the invention there is provided a rail-to-post connection assembly for connecting a hollow post to a rail or a pair of rails, a hollow within the post defined by internal walls, the connection assembly having:
 a pair of partially overlapping arms;
 an insert shaped to fit partially or wholly within the hollow of the post;
 a primary fastener having a shaft, the shaft passing through a hole within an overlapping portion of each of the arms into the insert thereby providing a pivot about which the arms can be adjusted to accommodate a range of alignment angles for connection to the rail or rails; and
 a locking means for locking the insert to the post,
 wherein the positions of the arm are lockable with respect to the insert and the insert is lockable with respect to the internal walls of the post by a single action of tightening the primary fastener.

Preferably the locking means comprises an upper portion of the insert defining a through hole and a lower portion of the insert defining a threaded hole for receiving a thread on the shaft, the through hole and shaft sized to provide relative clearance,
 wherein the upper and lower portions join at inclined engaging faces that slide relative to each other when forced together by tightening of the primary fastener, so as to cause the insert to grip the internal walls.

Preferably the primary fastener is a threaded bolt having a head that recesses within the uppermost of the two arms.

Preferably each of the arms defines at least one fastener hole for receiving a secondary fastener.

Preferably the holes are shaped to receive a countersunk rivet or screw.

A specific embodiment of the invention will now be described in some further detail with reference to and as illustrated in the accompanying figures. This embodiment is illustrative, and is not meant to be restrictive of the scope of the invention.

DESCRIPTION OF PREFERRED EMBODIMENT OF THE INVENTION

A preferred embodiment of the invention is illustrated in the accompanying representations in which:

FIGS. 2 and 3 are plan and elevational views respectively of the assembly shown in FIG. 1.

Figure 1:
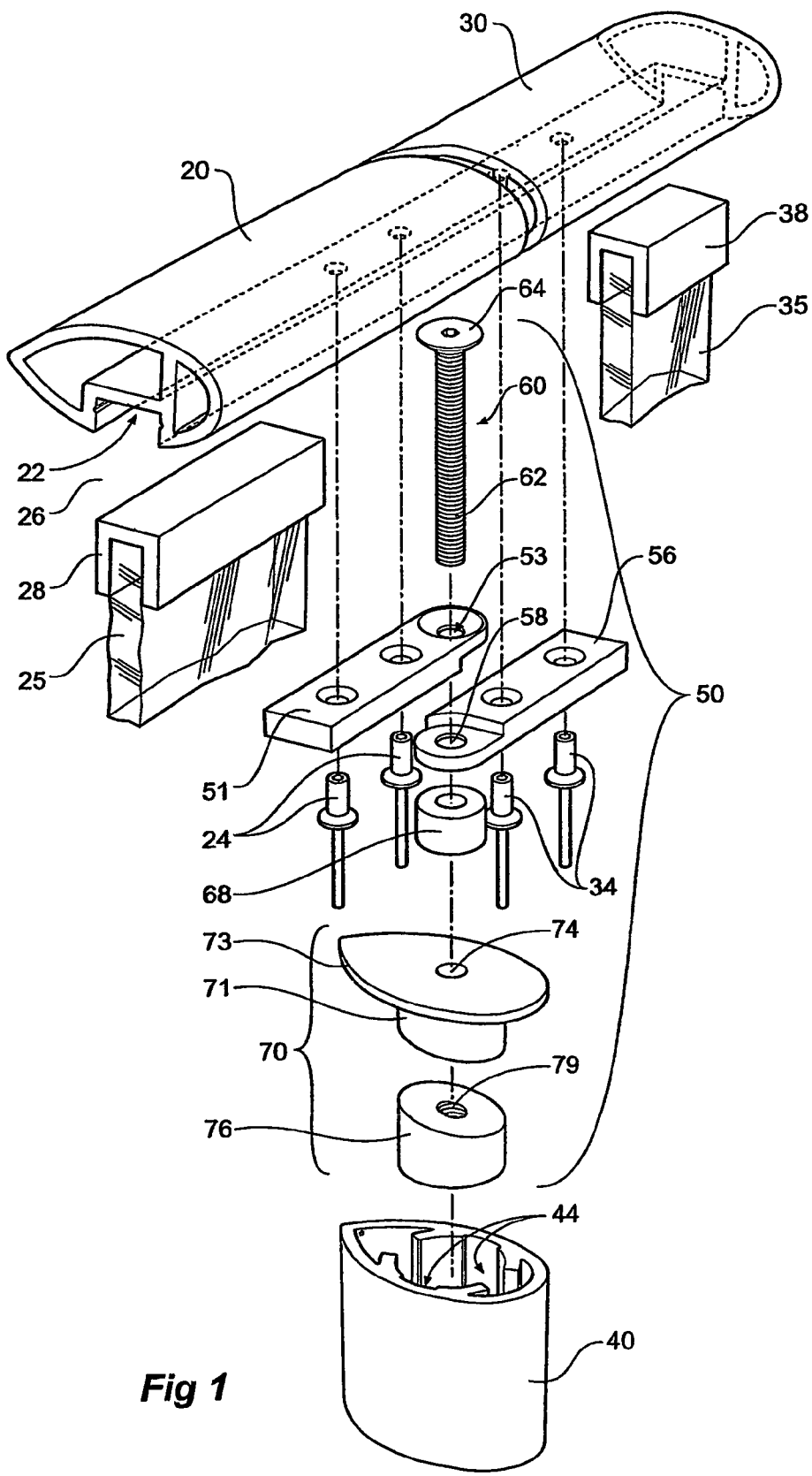
FIG. 1 is an exploded perspective view of a handrail and supported panel assembly according to an embodiment of the invention.

Referring to the drawings, in particular FIG. 1, a handrail and supported panel assembly 10 according to the invention is shown. The handrail and supported panel assembly 10 comprises first and second handrail portions 20 and 30, a panel 25 supported at a top of the edge thereof, a post 40, and a handrail-to-post connection assembly 50 located between the post 40 and the first and second handrails 20 and 30. The handrail portions 20 and 30 each have a constant cross-section, the constant cross-section defining an elongate recessed channel 22 on the underside. FIGS. 2 and 3 show how the assembly can extend to any length and can be used for barriers having complex shapes.

Figure 5:
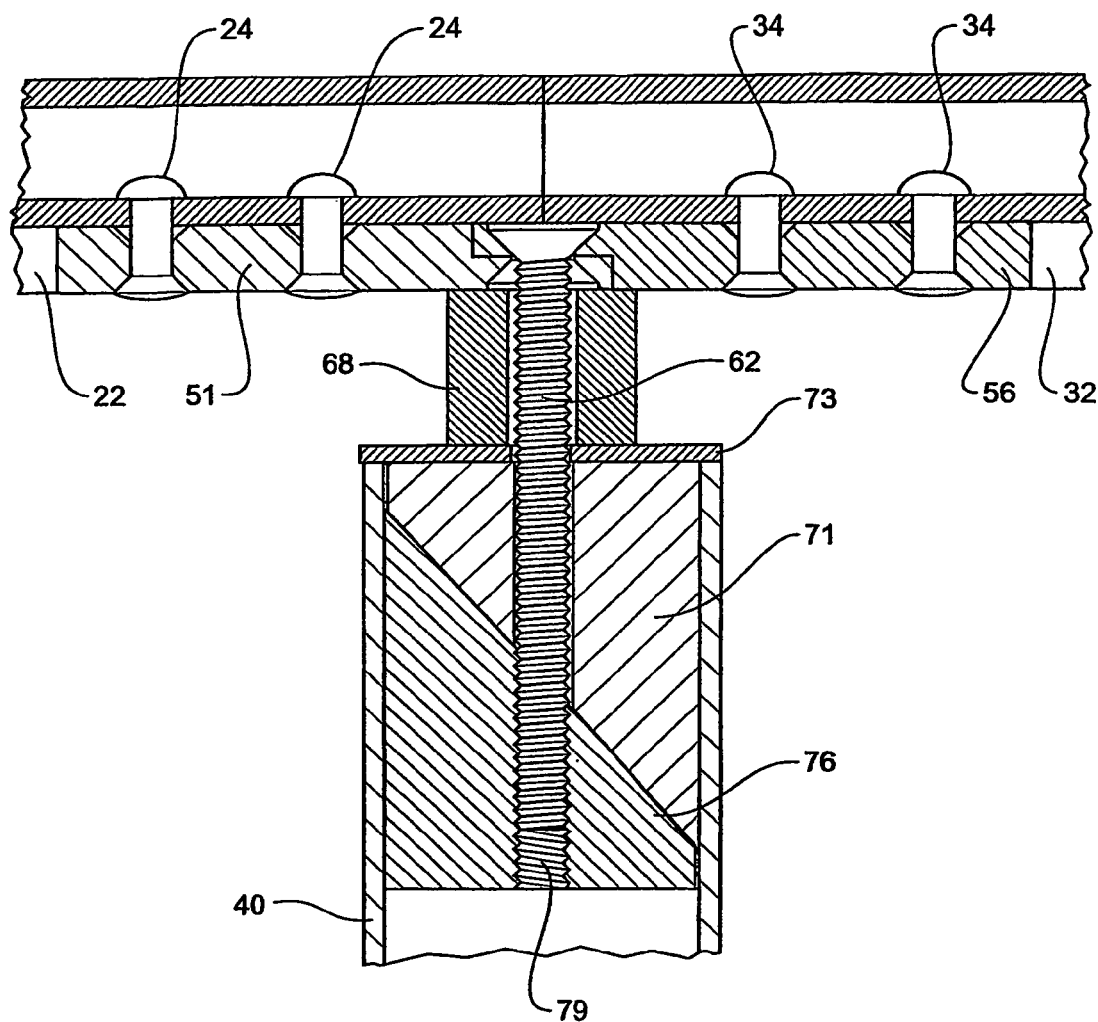
FIG. 5 is a cross-sectional view of the assembly shown in FIG. 1.

Referring to FIGS. 1 and 5, the handrail-to-post connection assembly 50 has a pair of partially overlapping arms 51 and 56. Each arm fits within respective recess channels 22 and 32 as is most clearly illustrated in the cross-sectional view of FIG. 5. A primary fastener in the form of a hex-headed bolt having a shaft 62 passes through holes 53 and 58 within an overlapping portion of each of the arms 51 and 56 thereby providing a pivot about which the arms can be adjusted. The shaft 62 extends into an insert 70 within the post 40 to provide a pivot about which the arms can be adjusted. A spacer is provided between arms 51 and 56 and the insert 70.

A feature of the handrail-to-post connection assembly is that the two arms 51 and 56 are identical. This simplifies construction and manufacture.

Secondary fasteners in the form of rivets 24 and 34 are provided to secure the arms 51 and 56 within respective channels 22 and 32 as is clearly shown in both FIGS. 1 and 5. In some applications, it may be appropriate to use fasteners other than rivets. For instance, screws may be used.

The insert 70 comprises a shaped washer 73, an upper portion 71 and a lower portion 76. The insert 70 is arranged to grip the internal walls 44 of the post 40. More specifically, upper portion 71 defines a through hole 74 and lower portion 76 defines a threaded hole 79 (this may be a blind hole or a through hole). The upper and lower portions 71 and 76 join at inclined engaging faces that slide relative to each other when forced together by tightening of the hex-headed bolt 60. This sliding movement causes the insert 70 to grip the internal walls 44 of the post. This can be seen in FIG. 5 where the lower portion 76 has moved laterally to the right relative to the upper portion 71. In other embodiments of the invention, the upper portion 71 and washer 73 may be combined into a single component.

Figure 4:
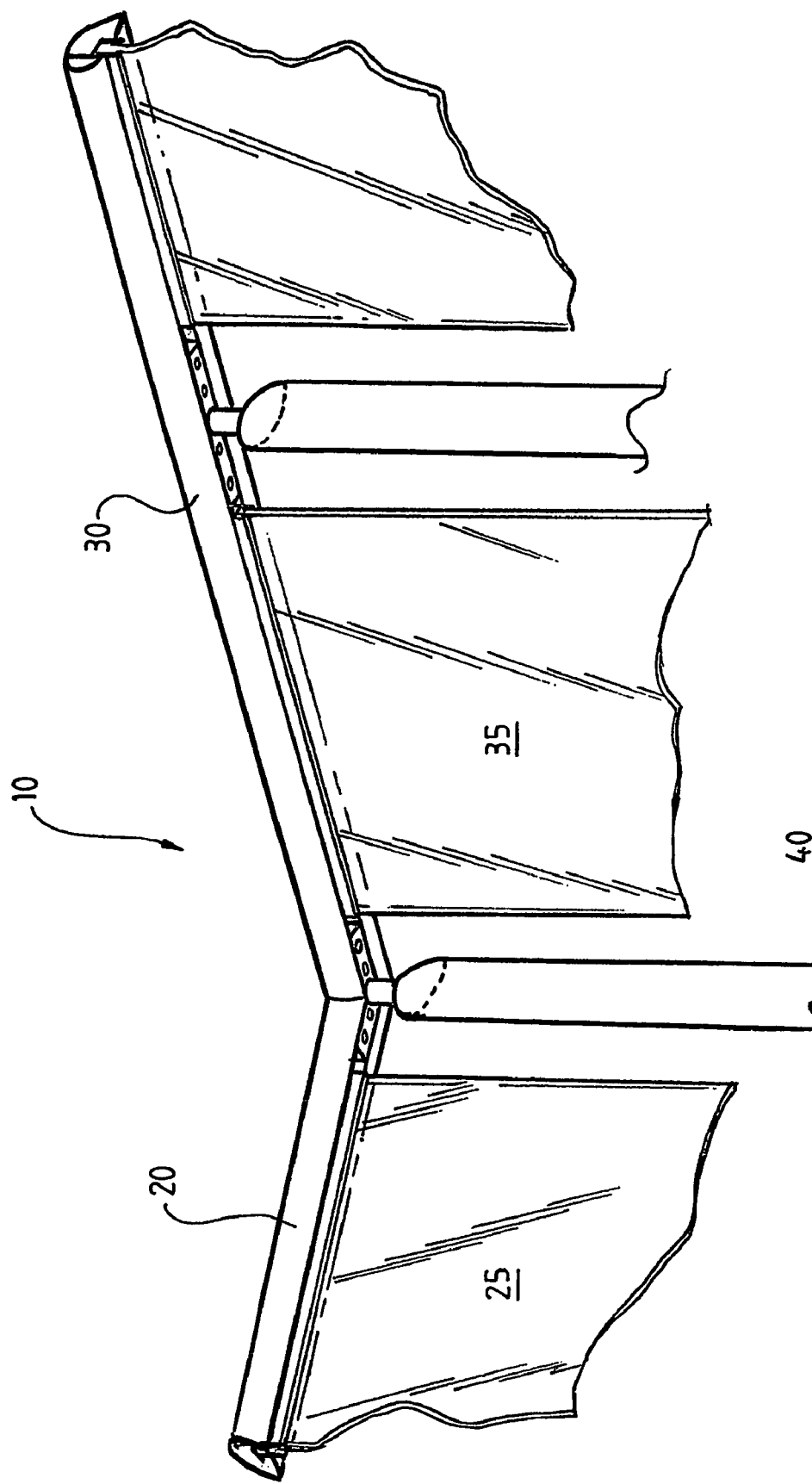
FIG. 4 is an underside perspective view of the assembly shown in FIGS. 1, 2 and 3.

Referring to FIG. 4, an underside perspective view of the assembly 10, it can be seen that the elongate recessed channel 22 has two important functions. Firstly it securely holds the upper edge of the panels in position and secondly it retains and recesses the arms of the handrail-to-post connection assembly. It can also be seen that, even from the underside, there are no finger entrapment points or untidy surfaces.

Figure 6:
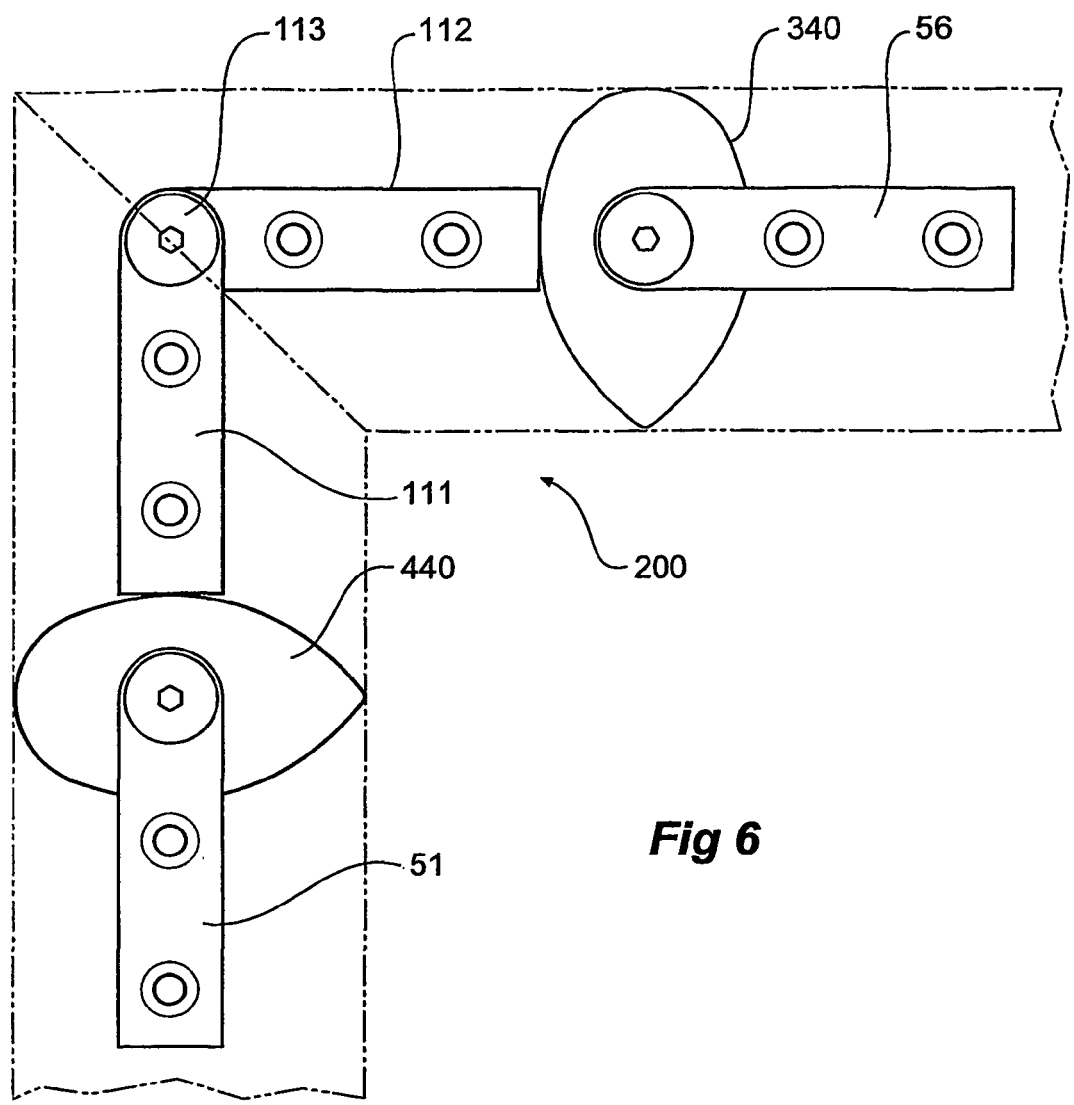
FIG. 6 shows a corner detail of the assembly illustrated in FIG. 2.

Referring to the plan view of FIG. 2, it can be seen that any desired handrail joining angle can be achieved above each post. Where architectural requirements dictate a pair of spaced apart posts adjacent a corner as illustrated at 200, this can readily be achieved. FIG. 6 shows a detailed plan view of the corner 200. The handrail portions are held together and correctly aligned by a pair of arms 111 and 112. These arms are the same arms as arms 51 and 56 shown in FIG. 1. The fastener 113 differs from the fastener 60 in that it comprises a short male portion that screws into a compact female portion thereby ensuring that there is little or no projection below the underside of the handrail portions (shown in dotted out-line). The handrail-to-post connection assembly between the posts adjacent the corner and the handrail portions are similar to the assembly 70 shown in FIG. 1 except that only one arm 51 is used. With the corner detail assembly illustrated in FIG. 6, the distance between posts 340 and 440 can be kept well below 100 millmetres in line with safety requirements.

Figure 7:
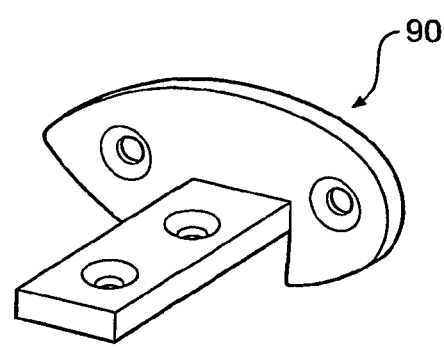
FIG. 7 shows a bracket detail of the assembly shown in FIG. 2.

Construction of a handrail and supported panel assembly 10 will now be described. Referring to FIG. 3, posts 140,40, 240,340 and 440 are fixed to the ground 5. Fixing may be by way of a spigot or any other convenient attachment means. Once the posts are in place, handrail portions can be cut to length for assembly. For instance, handrail portion 20 spanning from the wall 7 over post 140 to post 40 can be cut to length. Once a special bracket such as the bracket shown in FIG. 7 has been attached to the wall 7, the handrail portion 20 can be installed into position shown in FIGS. 2 and 3. Arm 51 is aligned to fit within the channel 22 of the handrail 20. The next portion of handrail 30 can now be cut allowing for the correct abutment angle to the next piece 130. Subsequent handrail portions 130, and 140 etc can then be cut and fitted loosely over respective posts. Once the handrail portions have been cut to length and the correct alignment angles for each of the arms 51 and 56 (as illustrated in FIG. 1) have been determined, the arms 51 and 56 can be locked in position by tightening of the hex-headed fastener 60. Tightening of the fastener 60 also firmly locks the handrail-to-post connection assembly 50 to the post 40. Once all of the handrail-to-post connection assemblies have been set in this way, the panels 125, 25, 35, 135 and 140 can progressively be installed as corresponding handrail portions 20, 30, 130 and 140 are lowered onto their support posts. Finally, rivets such as those shown in FIG. 5 as 22 and 32 can be installed to secure the assembly.

With the assembly as so far described, the top edges of the panels are securely held in place within the channels that form part of the underside of the handrail portions. The lower edges of the panels must also be secured. This can be achieved in a number of ways. For instance, prior to assembly, U-shape channels may be fixed to the ground 5 in positions ready to receive the panel edges.

The preferred material for the assembly 10 is anodized aluminium. This material has excellent erosion resistance and appearance.

While the embodiment of the invention described above includes a handrail, other top rails that are not shaped as hand rails may be used, for instance, where the height of the top rail is not generally at a typical handrail height.

While the present invention has been described in terms of a preferred embodiment in order to facilitate better understanding of the invention, it should be appreciated that various modifications can be made without departing from the principles of the invention. Therefore, the invention should be understood to include all such modifications within the scope.

The invention claimed is:

1. A rail and supported panel assembly comprising:
    a first rail portion and a second rail portion, the first rail portion having a constant cross section and, defining a first elongate recessed channel in a first underside of the first rail portion, the second rail portion having a constant cross section and defining a second elongate recessed channel in a second underside of the second rail portion;
    a panel supported at a top edge thereof within the first recessed channel;
    a first post for supporting the first and second rail portions, a hollow within the first post defined by internal walls; and
    a rail-to-post connection assembly located between the first post and the first and second rails, the connection assembly having:

a pair of partially overlapping arms, a first arm of said overlapping arms fitting wholly or substantially within the first recessed channel of the first rail portion, and a second arm of said overlapping arms fitting wholly or substantially within the second recessed channel of the second rail portion;

a primary fastener having a shaft, the shaft passing through a hole within an overlapping portion of each of the arms thereby providing a pivot about which the arms can be adjusted to accommodate a range of first and second rail portion alignment angles; and a removable insert shaped to fit at least partially within the hollow of the post, the insert comprising an upper portion defining a through hole and a lower separate portion defining a threaded hole for receiving a thread on the shaft of the primary fastener, the though hole and the shaft being sized to provide clearance between the though hole and the shaft, the upper and lower portions of the insert having facing inclined faces that slide relative to each other when forced together by tightening of the primary fastener thereby causing the insert to grip the internal walls of the post;

wherein the position of each of the anus is lockable with respect to the insert and the insert is lockable with respect to the internal walls of the post by a single action of tightening the primary fastener.

2. The assembly according to claim 1 further comprising secondary fasteners connecting each of the arms to the respective rail portion to which the arm is fitted.

3. The assembly according to claim 2 wherein the secondary fasteners are rivets, each rivet penetrating though the arm up to the respective rail portion to which the arm is fitted.

4. The assembly according to claim 1, wherein the insert is a locking member configured to grip the internal walls.

5. The assembly according to claim 1, wherein tightening of the primary fastener causes lateral movement of the upper and lower portions of the insert relative to each other, so that each portion grips the internal wall of the post.

6. A rail-to-post connection assembly for connecting a hollow post to a rail or a pair of rails, a hollow within the post defined by internal walls, the connection assembly having:

a pair of partially overlapping arms;

an insert shaped to fit partially or wholly within the hollow of the post;

a primary fastener having a shaft, the shaft passing through a hole within an overlapping portion of each of the arms into the insert thereby providing a pivot about which the arms can be adjusted to accommodate a range of alignment angles for connection to the rail or rails; and a lock for locking the insert to the post, the lock comprising an upper portion of the insert defining a though hole and a separate lower portion of the insert defining a threaded hole for receiving a thread on the shaft, the through hole and the shaft being sized to provide clearance between the through hole and the shaft, the upper and lower portions of the insert having facing inclined faces that slide relative to each other when forced together by tightening of the primary fastener thereby causing the insert to grip the internal walls of the post;

wherein the position of each of the arms is lockable with respect to the insert and the insert is lockable with respect to the internal walls of the post by a single action of tightening the primary fastener.

7. The rail-to-post connection assembly according to claim 6, wherein the sliding causes lateral movement of the upper portion of the insert relative to the lower portion of the insert to grip the internal walls thereby.

8. The rail-to-post connection assembly according to claim 7 wherein the primary fastener is a bolt having a head that recesses within the uppermost of the two arms.

9. The rail-to-post connection assembly according to claim 8 wherein each of the arms defines at least one fastener hole for receiving a secondary fastener.

10. The rail-to-post connection assembly according to claim 9 wherein the holes are shaped to receive a countersunk rivet or screw.

\* \* \* \* \*

UNITED STATES PATENT AND TRADEMARK OFFICE
CERTIFICATE OF CORRECTION

PATENT NO. : 7,641,180 B2  Page 1 of 1
APPLICATION NO. : 10/571619
DATED : January 5, 2010
INVENTOR(S) : David Adderton It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 551 days.

Signed and Sealed this

Sixteenth Day of November, 2010

David J. Kappos
*Director of the United States Patent and Trademark Office*